(12) United States Patent
Choi et al.

(10) Patent No.: US 11,640,437 B1
(45) Date of Patent: May 2, 2023

(54) PROCESS FOR SEARCHING FOR AND RECOMMENDING POI THROUGH POI MODELING AND SYSTEM FOR DRIVING THE SAME

(71) Applicant: LOYQU Inc., Seoul (KR)

(72) Inventors: Goya Choi, Gimpo-si (KR); Changhoon Lyu, Gimpo-si (KR)

( * ) Notice: Subject to any disclaimer, the term of this patent is extended or adjusted under 35 U.S.C. 154(b) by 0 days.

(21) Appl. No.: 17/732,235

(22) Filed: Apr. 28, 2022

(30) Foreign Application Priority Data

Nov. 26, 2021 (KR) .................. 10-2021-0165716
Feb. 14, 2022 (KR) .................. 10-2022-0018715

(51) Int. Cl.
*G06F 16/9537* (2019.01)
*G06F 16/29* (2019.01)
*G06F 16/9538* (2019.01)

(52) U.S. Cl.
CPC .......... *G06F 16/9537* (2019.01); *G06F 16/29* (2019.01); *G06F 16/9538* (2019.01)

(58) Field of Classification Search
None
See application file for complete search history.

(56) References Cited

U.S. PATENT DOCUMENTS

| 2021/0239486 | A1* | 8/2021 | Liang | G06N 20/00 |
| 2021/0248461 | A1* | 8/2021 | Cheng | G06N 3/0454 |
| 2022/0101199 | A1* | 3/2022 | Liu | B60L 53/67 |
| 2022/0248170 | A1* | 8/2022 | Zhao | H04W 4/025 |
| 2022/0291011 | A1* | 9/2022 | Selina | G01C 21/3679 |

FOREIGN PATENT DOCUMENTS

| KR | 10-2009-0117355 | 11/2009 |
| KR | 10-2015-0015259 | 2/2015 |
| KR | 10-2019-0124524 | 11/2019 |
| KR | 10-2021-0103401 | 8/2021 |

OTHER PUBLICATIONS

English Specification of 10-2019-0124524.
English Specification of 10-2021-0103401.
English Specification of 10-2009-0117355.
English Specification of 10-2015-0015259.

* cited by examiner

*Primary Examiner* — Robert W Beausoliel, Jr.
*Assistant Examiner* — Cheryl M Shechtman
(74) *Attorney, Agent, or Firm* — Antonio Ha & U.S. Patent, LLC (57) ABSTRACT

According to an embodiment, a system for driving a point-of-interest (POI) search and recommend process through POI modeling comprises a POI data pre-processing unit gathering POIs to be modeled, extracting POI features from the gathered POIs by a service provider, and classifying the POIs by POI categories, a POI modeling unit modeling the POIs and outputting the modeled POIs, the modeled POIs including attribute information and learning-purpose features, a POI information providing unit providing the modeled POIs, by the POI features or the POI categories, through a user terminal, a POI search unit receiving a search request including a keyword or a POI feature from the user terminal, and a POI recommending unit learning user data based on the learning-purpose features included in the modeled POIs and recommending a user-customized POI list through the user terminal.

6 Claims, 5 Drawing Sheets

Search for tourist destination

Categories
- ☑ Local attractions
- ☐ Natural attractions
- ☐ Tickets/services
- ☐ Restaurants
- ☐ Cafes
- ☐ + Add Tourist destinations by theme
- ☐ Places visitable on rainy days
- ☑ Places with good view
- ☐ Places for healing
- ☑ Photo zones
- ☐ Hots
- ☐ + Add Tourist destinations by companion type
- ☐ Family
- ☐ Friend
- ☑ Couple
- ☐ Toddler
- ☐ Pet Tourist destinations by time
- ☑ AM
- ☐ PM
- ☐ Evening Busan photo zone/family travel
Must-visit places in Busan Busan photo zone/family travel
Must-visit places in Busan Busan travel with toddler/family travel
Must-visit places in Busan Busan photo zone/family travel
Must-visit places in Busan Busan family travel couple travel friendship travel
Must-visit places in Busan Busan photo zone/family travel
Must-visit places in Busan Busan photo zone/family travel
Must-visit places in Busan Busan travel with toddler
Must-visit places in Busan Busan travel with toddler
Must-visit places in Busan

FIG. 4

FIG. 5

PROCESS FOR SEARCHING FOR AND RECOMMENDING POI THROUGH POI MODELING AND SYSTEM FOR DRIVING THE SAME

CROSS-REFERENCE TO RELATED APPLICATION(S)

This application is based on and claims priority under 35 U.S.C. 119 to Korean Patent Application Nos. 10-2021-0165716 and 10-2022-0018715, respectively filed on Nov. 26, 2021 and Feb. 14, 2022, in the Korean Intellectual Property Office, the disclosures of which are herein incorporated by reference in their entireties.

TECHNICAL FIELD

Embodiments of the disclosure relate to a POI search and recommend process through POI modeling and a system for driving the POI search and recommend process and, more specifically, to a POI search and recommend process and a system for driving the same, which may classify or categorize POIs according to features (or feature information) predefined or extracted by a service provider for POI modeling and features (or feature information) updated by the user.

DESCRIPTION OF RELATED ART

Point-of-interest (POI) refers to information or data displayed, on an electronic map, with coordinates of major facilities, stations, airports, terminals, hotels, or major travel or tourist destinations.

Conventional POI search systems or methods provide a simple search function, such as by POI name, category, and rating. Conventional POI recommendation systems or methods perform POI recommendation based merely on one-dimensional values, such as keyword search volume, number of saves, and reviews. As generation of new POIs and disappearance of existing POIs are recently more frequent, and people's preferred POIs are further divided and diversified, conventional POI search and recommendation systems or methods do not suffice to meet users' needs.

Conventionally, if a specific POI requested by the user is not searched or found, other POIs related to or corresponding to the specific POI are recommended based on frequencies. However, such frequency-based POI recommendation does not provide satisfactory results but, in many cases, give a list of POIs irrelevant to the specific POI requested by the user. Therefore, a need exists for a technique that may recommend POIs substantially matching or related to a specific POI requested by the user when the specific POI is not searched.

SUMMARY

According to an embodiment, there are provided a POI search and recommend process through POI modeling and a system for driving the process, which may allow the user to directly define POI features (or POI feature information, POI feature data, or POI value) to thereby provide a better search result reflecting the user's needs.

According to an embodiment, there are provided a POI search and recommend process through POI modeling and a system for driving the process, which may allow search criteria for massive data on the web to be defined as features set by the user and thereby enable more efficient classification and search for necessary data among massive data on the web.

According to an embodiment, a system for driving a point-of-interest (POI) search and recommend process through POI modeling comprises a POI data pre-processing unit gathering POIs to be modeled, extracting POI features from the gathered POIs by a service provider, and classifying the POIs by POI categories, a POI modeling unit modeling the POIs and outputting the modeled POIs, the modeled POIs including attribute information and learning-purpose features, a POI information providing unit providing the modeled POIs, by the POI features or the POI categories, through a user terminal, a POI search unit receiving a search request including a keyword or a POI feature from the user terminal, and a POI recommending unit learning user data based on the learning-purpose features included in the modeled POIs and recommending a user-customized POI list through the user terminal.

The POI data pre-processing unit may include a POI gathering unit gathering the POIs to be modeled, a feature extracting unit extracting the POI features from the gathered POIs by the service provider, and a classifying unit classifying the POIs by the extracted POI features or POI categories.

The system may further comprise a POI feature updating unit updating the POI features with POI feature update information received from the user terminal. The POI features extracted by the service provider and the updated POI features may include a combination of default features and the learning-purpose features.

The system may further comprise a POI modeling management unit adding, modifying, or deleting the modeled POIs or the updated POI features.

The POI recommending unit may recommend a POI based on the POI features extracted by the service provider, POI features received from the user terminal, or the modeled POIs.

According to an embodiment, a POI search and recommend process through POI modeling comprises a POI data pre-processing step gathering POIs to be modeled, extracting POI features from the gathered POIs by a service provider, and classifying the POIs by POI categories, a POI modeling step modeling the POIs and outputting the modeled POIs, the modeled POIs including attribute information and learning-purpose features, a POI information providing step providing the modeled POIs, by the POI features or the POI categories, through a user terminal, a POI search step receiving a search request including a keyword or a POI feature from the user terminal, and a POI recommending step learning user data based on the learning-purpose features included in the modeled POIs and recommending a user-customized POI list through the user terminal.

The POI data pre-processing step may include a POI gathering step gathering the POIs to be modeled, a feature extracting step extracting the POI features from the gathered POIs by the service provider, and a classifying step classifying the POIs by the extracted POI features or POI categories.

The POI search and recommend process may further comprise a POI feature updating step updating the POI features with POI feature update information received from the user terminal. The POI features extracted by the service provider and the updated POI features may include a combination of default features and the learning-purpose features.

The POI search and recommend process may further comprise a POI modeling management step adding, modifying, or deleting the modeled POIs or the updated POI features.

The POI recommending step may recommend a POI based on the POI features extracted by the service provider, POI features received from the user terminal, or the modeled POIs.

According to embodiments, it is possible to allow the user to directly define POI features (or POI feature information, POI feature data, or POI value) to thereby provide a better search result reflecting the user's needs.

According to embodiments, it is possible to allow search criteria for massive data on the web to be defined as features set by the user and thereby enable more efficient classification and search for necessary data among massive data on the web.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

The terms as used herein are provided merely to describe some embodiments thereof, but not to limit the present disclosure. The terms as used herein are provided merely to describe some embodiments thereof, but not to limit the scope of other embodiments of the present disclosure. Unless otherwise defined, all terms including technical and scientific terms used herein have the same meaning as commonly understood by one of ordinary skill in the art to which the embodiments of the disclosure pertain and should not be interpreted as overly broad or narrow.

Hereinafter, preferred embodiments of the disclosure are described in detail with reference to the accompanying drawings.

Figure 1:
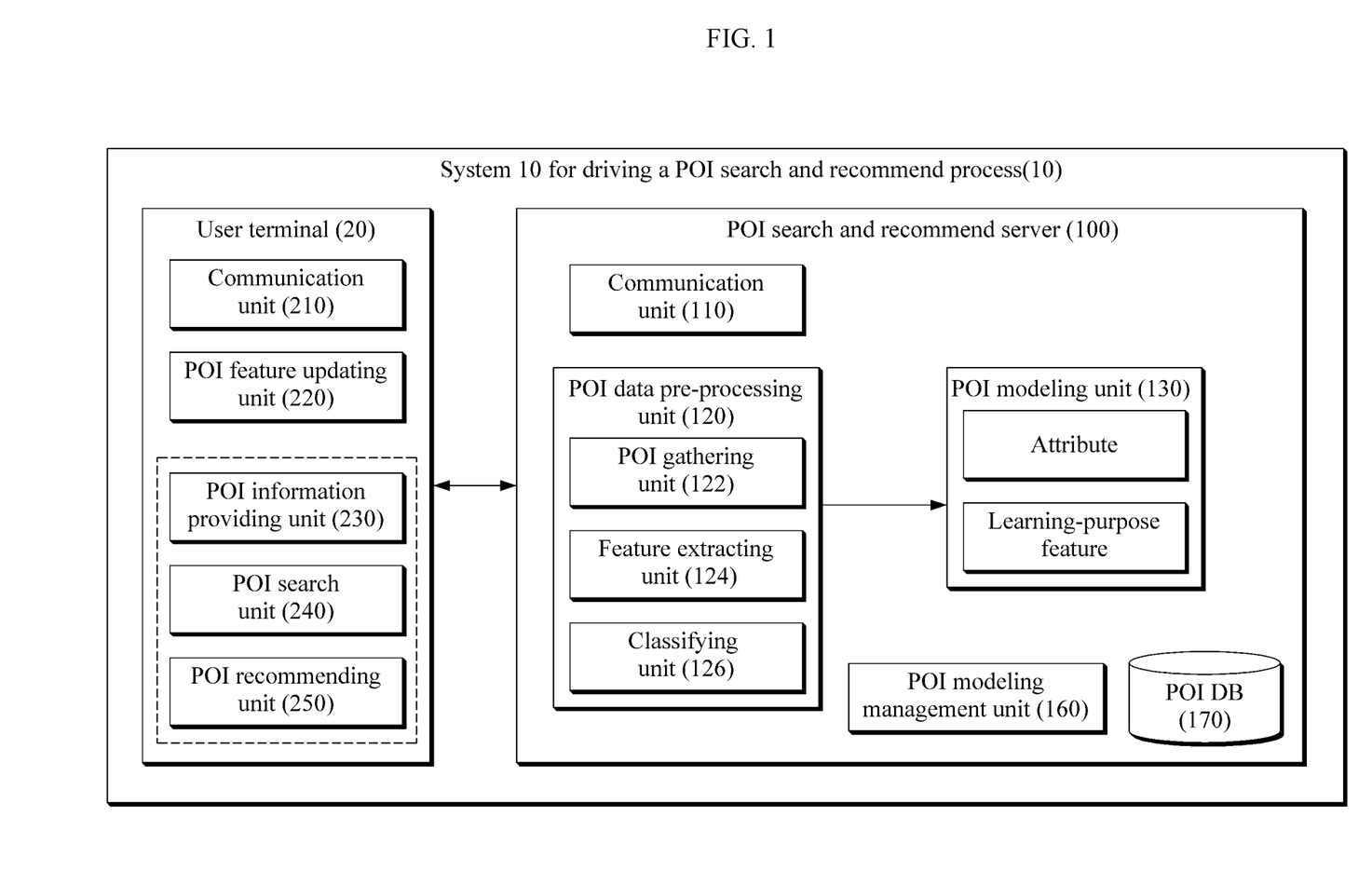
FIG. 1 is a block diagram illustrating a configuration of a system for driving a POI search and recommend process through POI modeling according to an embodiment.

FIG. 1 is a block diagram illustrating a configuration of a system for driving a POI search and recommend process through POI modeling according to an embodiment.

According to an embodiment, the system 10 for driving a POI search and recommend process may receive various POI features from the service provider or user and search for or recommend modeling data (or modeled data, POIs, POI data, or POI information) reflecting the received POI feature. To that end, the system 10 may gather targets (e.g., POIs or POI information or data) to be modeled through crawling, document/data lookup, or on-site inspection, classify the gathered POIs by categories, extract necessary features (POI features) per classified POI, and model the gathered POIs (POI information or POI data). The modeled POI information or data may be referred to as POI modeling data or information. The system 10 may provide the functions of inputting, modifying, deleting, and managing the POI modeling data and may provide the POI modeling data to the user's terminal through, e.g., the Internet, so that the user may use the POI modeling data.

The system 10 may provide a search function with the POI feature-reflected modeling data received through a POI modeling management unit, as well as POI name search and may recommend a POI based on the modeling data reflecting the POI feature defined by the user or service provider.

For example, the system 10 for driving a POI search and recommend process through POI modeling includes a user terminal 20 and a POI search and recommend server 100.

Referring to FIG. 1, according to an embodiment, the system 10 for driving a POI search and recommend process includes a communication unit 110, a POI data pre-processing unit 120, a POI modeling unit 130, a POI feature updating unit 220, a POI information providing unit 230, a POI search unit 240, a POI recommending unit 250, a POI modeling management unit 160, and a POI DB 170.

The communication unit 110 or 210 forms a communication connection with any internal component or at least one external terminal via a wired/wireless communication network. The external terminal may include the POI search and recommend server 100 and the user terminal 20. Wireless Internet technology which may be adopted for transmission over the wireless communication network may include at least one of wireless LAN (WLAN), digital living network alliance (DLNA), wireless broadband (Wibro), world interoperability for microwave access (Wimax), high speed downlink packet access (HSDPA), high speed uplink packet access (HSUPA), IEEE 802.16, long-term evolution (LTE), LTE-advanced (LTE-A), LTE V2X (C'V2X), wireless mobile broadband service (WMBS), or 5G communication. The communication unit 210 may transmit or receive data according to at least one wireless Internet technology which may include not only the above-enumerated techniques but also other non-mentioned Internet techniques. Short-range communication techniques that may be adopted according to an embodiment may include Bluetooth, radio frequency identification (RFID), infrared data association (IrDA), ultra-wideband (UWB), ZigBee, near-field communication (NFC), ultrasound communication (USC), visible light communication (VLC), Wi-Fi, or Wi-Fi direct. Wired communication techniques that may be adopted according to an embodiment may include power line communication (PLC), universal serial bus (USB) communication, Ethernet, serial communication, or optical/coaxial cable communication.

The user terminal 20 may be applicable to various terminals or devices, such as smartphones, portable terminals, mobile terminals, foldable terminals, personal digital assistants (PDAs), portable multimedia players (PMPs), telematics terminals, navigation terminals, personal computers, laptop computers, slate PCs, tablet PCs, Ultrabook computers, wearable devices, such as smartwatches, smart glasses, head-mounted displays, etc., Wibro terminals, Internet protocol television (IPTV) terminals, smart TVs, digital broadcast terminals, audio video navigation (AVN) terminals, audio/video (A/V) systems, flexible terminals, or digital signage devices.

The POI data pre-processing unit 120 may gather target POIs to be modeled, extract the feature for each POI by the service provider, classify the POI per category according to the extracted POI feature, and models the POI. According to an embodiment, the POI data pre-processing unit 120 may add, modify, delete, and edit the modeling data input from the user terminal 20.

Some of attribute values for POI modeling may be set through the POI data pre-processing unit 120. Initial attribute values first inputted may include default information, such as category, location/contact/use time, and feature information (e.g., good for photographing or good for healing) including the features of a travel destination.

New feature information, other than the feature information values set as default, may be set by the user.

According to an embodiment, the POI data pre-processing unit 120 includes a POI gathering unit 122 that gathers target POIs to be modeled through, e.g., crawling, document/data lookup, or on-site inspection, a feature extracting unit 124 that extracts a POI feature, by the service provider, for each of the POIs gathered by the POI gathering unit 122, and a classifying unit 126 that classifies the POI per POI category or for each of the per-POI features extracted by the feature extracting unit 124.

The POI gathering unit 122 is implemented to gather target POIs to be modeled by various methods, e.g., crawling, document/data lookup, or on-site inspection. The POI gathering unit 122 filters, extracts, and gathers web data corresponding to, e.g., the POI name or location, from the gathered web data (e.g., the gathered target POIs).

The feature extracting unit 124 extracts features from the data gathered by the POI gathering unit 122. According to an embodiment, the POI feature may be formed of a combination of default feature values defined as a finite set by the service provider. However, without limited thereto, the POI feature may further include features defined by the user. POI feature update information may be inputted by the user through the POI feature updating unit 220 of the user terminal 20 and may be added by the POI modeling management unit 160 of the POI search and recommend server 100.

The classifying unit 126 classifies the POIs into categories according to the per-POI features extracted by the feature extracting unit 124.

According to an embodiment, the POI modeling unit 130 of the POI search and recommend server 100 performs POI modeling so that the POI feature information may be vectorized according to the setting feature classified by the classifying unit 126, thereby generating a POI model. The POI modeling unit 130 models feature values, extracted for the list of the gathered POIs, classified values, and default information, constituting the POI model.

The POI modeling unit 130 models the POIs gathered by the POI data pre-processing unit 120 and outputs the POI model including attribute information and features for learning. For example, the POI model obtained by the POI modeling unit 130 includes attributes (general features) including category classified values, prices or costs, location, or other default information, and travel destination feature values, and learning-purpose features used for artificial intelligence (AI) training, e.g., for route recommendation or travel destination recommendation, among the travel destination feature values.

The feature information may include information such as objective indexes, such as location information (GPS coordinate information) about the POI object or price attribute, and subjective indexes, such as keywords or preferences included in reviews or introductions on web postings. The POI feature may be defined as a combination of default feature values defined as a finite set by the service provider according to such a criterion as the objective index and subjective index, and the POI feature information may thereby be modeled.

The POI information providing unit 230 classifies the POI modeled by the POI data pre-processing unit 120 by category and provides it to the user terminal 20.

Figure 2:
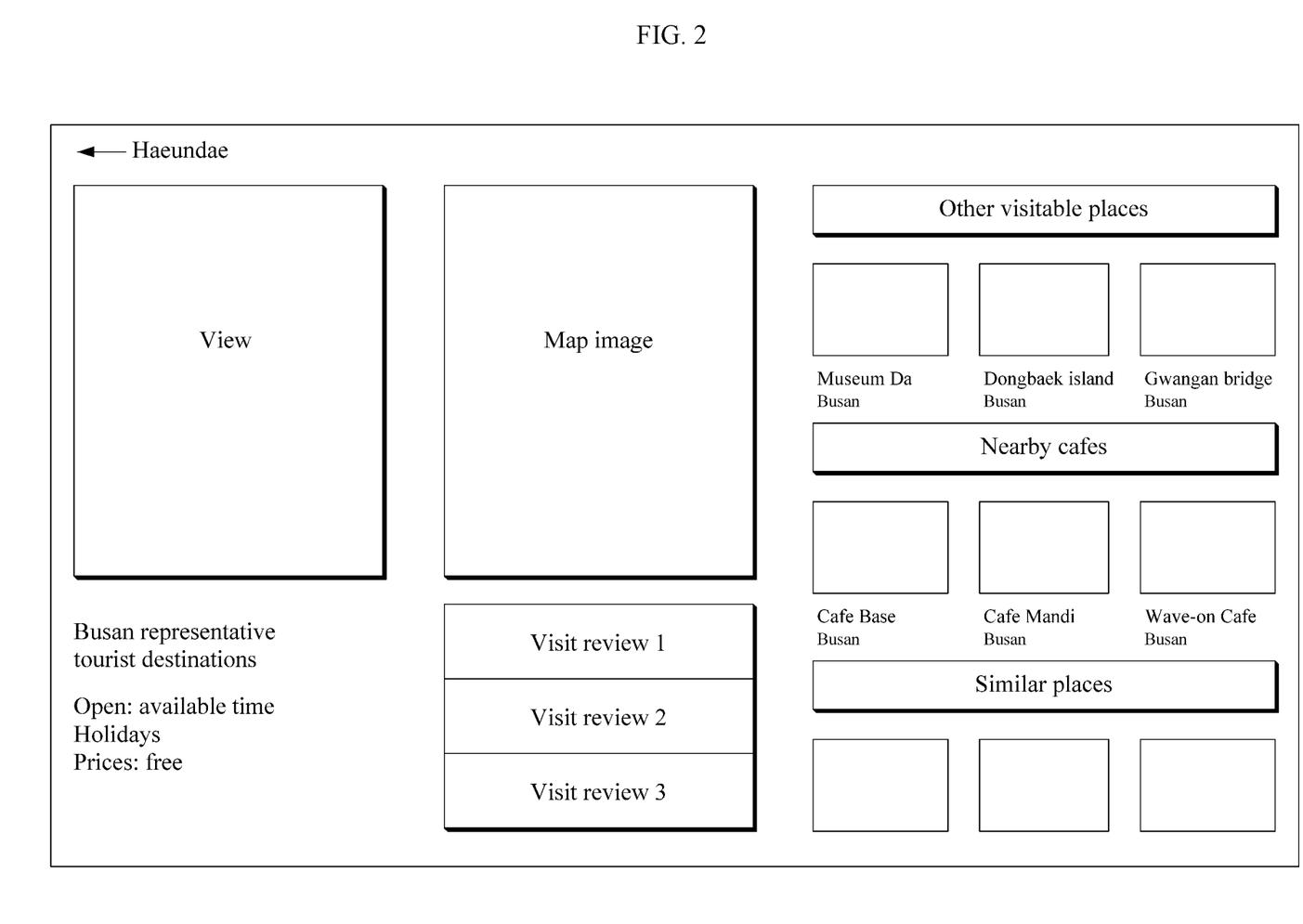
FIG. 2 is a view illustrating operations of a POI information providing unit according to an embodiment.

FIG. 2 is a view illustrating operations of a POI information providing unit according to an embodiment.

Referring to FIG. 2, according to an embodiment, the POI information providing unit 230 provides the user with the POI data, modeled by the POI modeling unit 130, i.e., the POI model. The POI information providing unit 230 may provide the modeled POI data through the webpage accessed by the user terminal 20 or the application running on the user terminal 20.

The POI information providing unit 230 may provide images and brief dictionary definitions, map images or other users' reviews, related places or visitable places, or cafes or restaurants within a predetermined distance, and a list of similar travel destinations, for the POI (e.g., Haeundae) requested to be searched or selected by the user. However, without limited thereto, other various pieces of information about the POI selected by the user may be provided.

Figure 3:
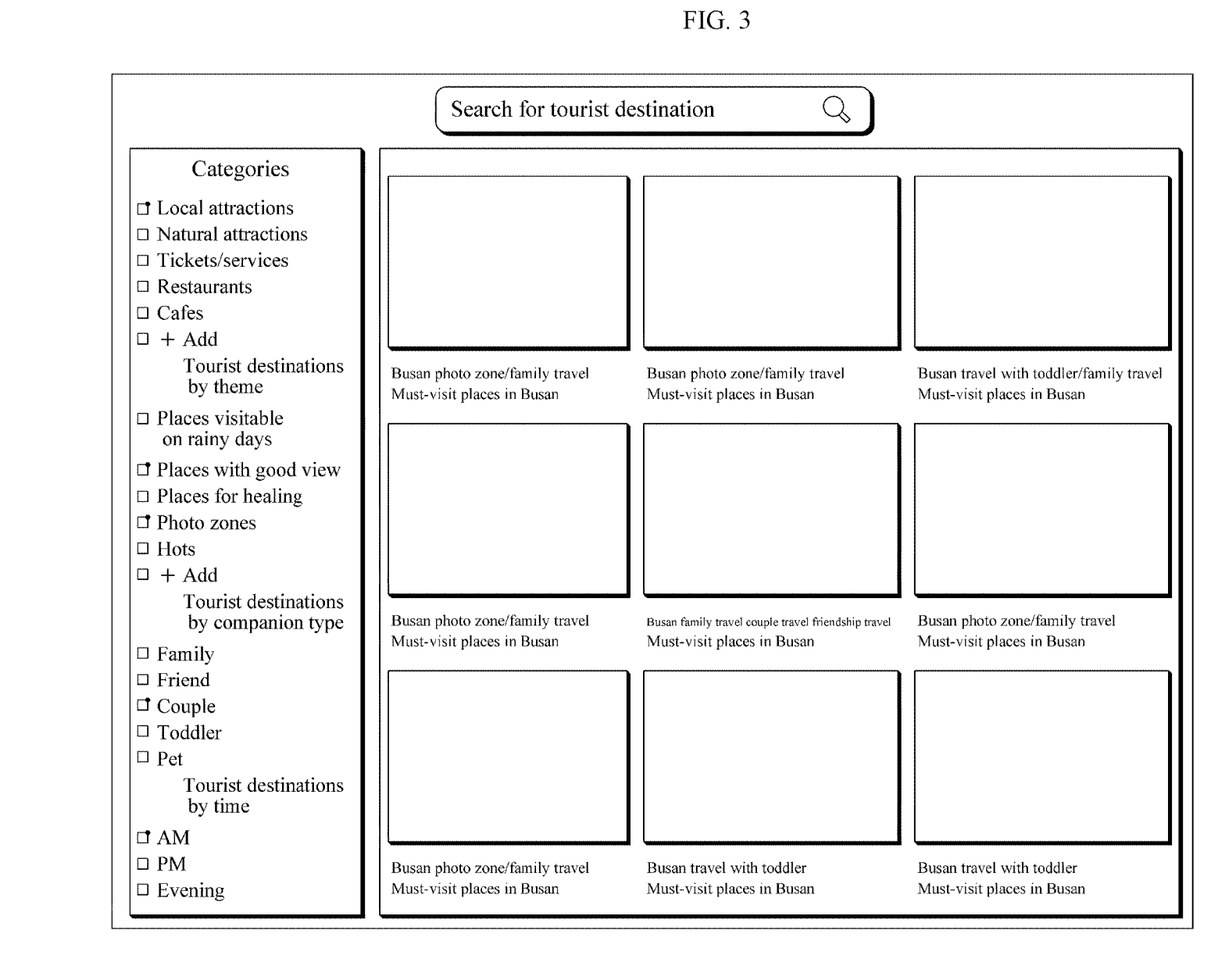
FIG. 3 is a view illustrating operations of a POI search unit according to an embodiment.

The POI search unit 240 receives a search request including the POI feature information received through a user interface of the user terminal 20. The POI search unit 240 may receive various types of search requests based on location information through a keyword or map image.

FIG. 3 is a view illustrating operations of a POI search unit according to an embodiment.

According to an embodiment, the POI search unit 240 may select at least one piece of feature information from among a plurality of pieces of POI feature information as shown in FIG. 3.

In this case, according to an embodiment, the items or features included in categories, per-theme travel destinations, travel destinations per companion type, and per-time travel destinations as shown in FIG. 3 may be modified, added, or deleted by the user.

The POI search unit 240 may receive a search request for a POI, as limited to, e.g., travel destination keyword or restaurant or cafe including the feature information defined by the user.

Figure 4:
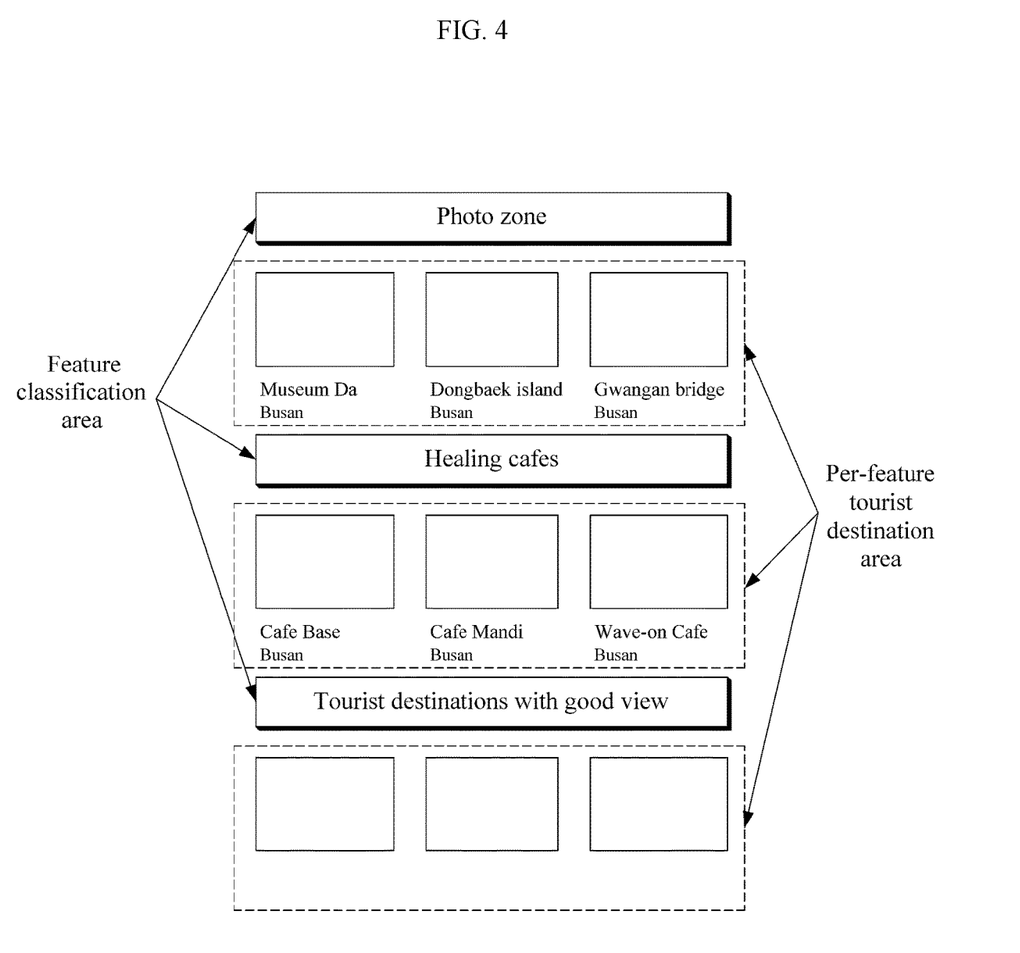
FIG. 4 is a view illustrating operations of a POI recommending unit according to an embodiment.

The POI recommending unit 250 may learn user data based on the learning-purpose features included in the POI modeled by the POI data pre-processing unit 120, thereby recommending a user-customized POI list.

The POI recommending unit 250 recommends a POI based on the modeling data reflecting the inputted POI features reflecting the user-defined information. There is included a function of recommending a feature-customized POI or recommending a modeled POI in which the user may be interested based on the user data.

FIG. 4 is a view illustrating operations of a POI recommending unit according to an embodiment.

According to an embodiment, referring to FIG. 4, the POI recommending unit 250 includes at least one travel destination, i.e., POI, in the per-feature travel destination area corresponding to the feature in each feature classification area. As shown in FIG. 4, the POI recommending unit 250 may distinguish and provide travel destinations according to feature classifications or categories, such as photo zone, list of healing cafes, or travel destinations with good view.

In this case, the feature classification areas may be added, deleted, or modified by the user. According to an embodiment, the POI recommending unit 250 may extract and recommend a POI object for each feature.

According to an embodiment, the POI recommending unit 250 may learn user data, e.g., the learning-purpose features of the POI model, based on artificial intelligence and grasp objective data, such as the same age or gender or residence location as the user, based on the user data. The POI recommending unit 250 may extract and recommend POI features or POI objects preferred by other users and having the same condition as the objective criterion.

Further, the POI recommending unit 250 may extract and recommend the POI objects in which the user may be interested, by monitoring the user's social media or social network service (SNS) or applying the result of search for the existing POI preferred by the user.

The POI recommending unit 250 may extract and recommend the POI object based on data inputted by the user to define the POI feature, from the user terminal 20. For example, when the user sets the POI feature as "cafe near beach,' the POI recommending unit 250 may recommend accommodations or travel destinations near the beach.

As another example, when the user sets the POI feature as 'travel destinations available for moving in wheelchair,' the POI recommending unit 250 may search and recommend restaurants or cafes located on the first floor or equipped with an elevator.

In other words, the POI recommending unit 250 may monitor the history of POI features set by the user, predict that POIs with the same objective/subjective index have a high user preference, and recommend the POIs.

The POI feature updating unit 220 may set per-POI features by the user's definition. For example, the user may directly set various features, such as places good to use a stroller, places available for scooters or bicycles, places available for moving in a wheelchair, places close to the parking lot, and cafes with access to the beach. As another example, the user may directly set various types of features, such as places where the discount rate of admission tickets or prices is a predetermined value or more or places rated high on a specific booking website.

The POI modeling management unit 160 manages the attribute (general feature) values and learning-purpose feature values included in the POI model. The POI modeling management unit 160 may manage the information inputted through the POI feature updating unit 220 of the user terminal 20.

The POI DB 170 may include at least one type of storage medium of flash memory types, hard disk types, multimedia card micro types, card types of memories (e.g., SD or XD memory cards), RAMs (Random Access Memories), SRAMs (Static Random Access Memories), ROMs (Read-Only Memories), EEPROMs (Electrically Erasable Programmable Read-Only Memories), PROMs (Programmable Read-Only Memories), magnetic memories, magnetic disks, or optical discs.

According to an embodiment, the POI DB 170 stores data necessary for the system 10 for driving a POI search and recommend process to provide a POI search and recommendation service. The POI DB 170 stores the POI information modeled by the POI data pre-processing unit 120 and content or data modified by the POI modeling management unit 160 or feature information defined by the user.

The communication unit 110 and the communication unit 210 may be communication interfaces or circuits (or circuitry) that perform communication between the user terminal 20 and the POI search and recommend server 100.

Each of the components, e.g., the POI feature updating unit 220, the POI information providing unit 230, the POI search unit 240, the POI recommending unit 250, the POI data pre-processing unit 120, the POI gathering unit 122, the feature extracting unit 124, the classifying unit 126, the POI modeling unit 130, and POI modeling management unit 160, may include, or be implemented as, an electrical circuit or circuitry configured to perform its corresponding functions or operations. According to an embodiment, the POI feature updating unit 220, the POI information providing unit 230, the POI search unit 240, the POI recommending unit 250, the POI data pre-processing unit 120, the POI gathering unit 122, the feature extracting unit 124, the classifying unit 126, the POI modeling unit 130, and POI modeling management unit 160 may be integrated into, or implemented as, a processor or controller (not shown) configured to perform the respective functions or operations thereof. The functions or operations performed by the POI feature updating unit 220, the POI information providing unit 230, the POI search unit 240, the POI recommending unit 250, the POI data pre-processing unit 120, the POI gathering unit 122, the feature extracting unit 124, the classifying unit 126, the POI modeling unit 130, and POI modeling management unit 160 may be programmed into code, instructions, or commands that may be stored in a memory (not shown) and that, when executed by a processor or controller (not shown), enable the processor or controller to perform the functions or operations of the POI feature updating unit 220, the POI information providing unit 230, the POI search unit 240, the POI recommending unit 250, the POI data pre-processing unit 120, the POI gathering unit 122, the feature extracting unit 124, the classifying unit 126, the POI modeling unit 130, and POI modeling management unit 160.

Figure 5:
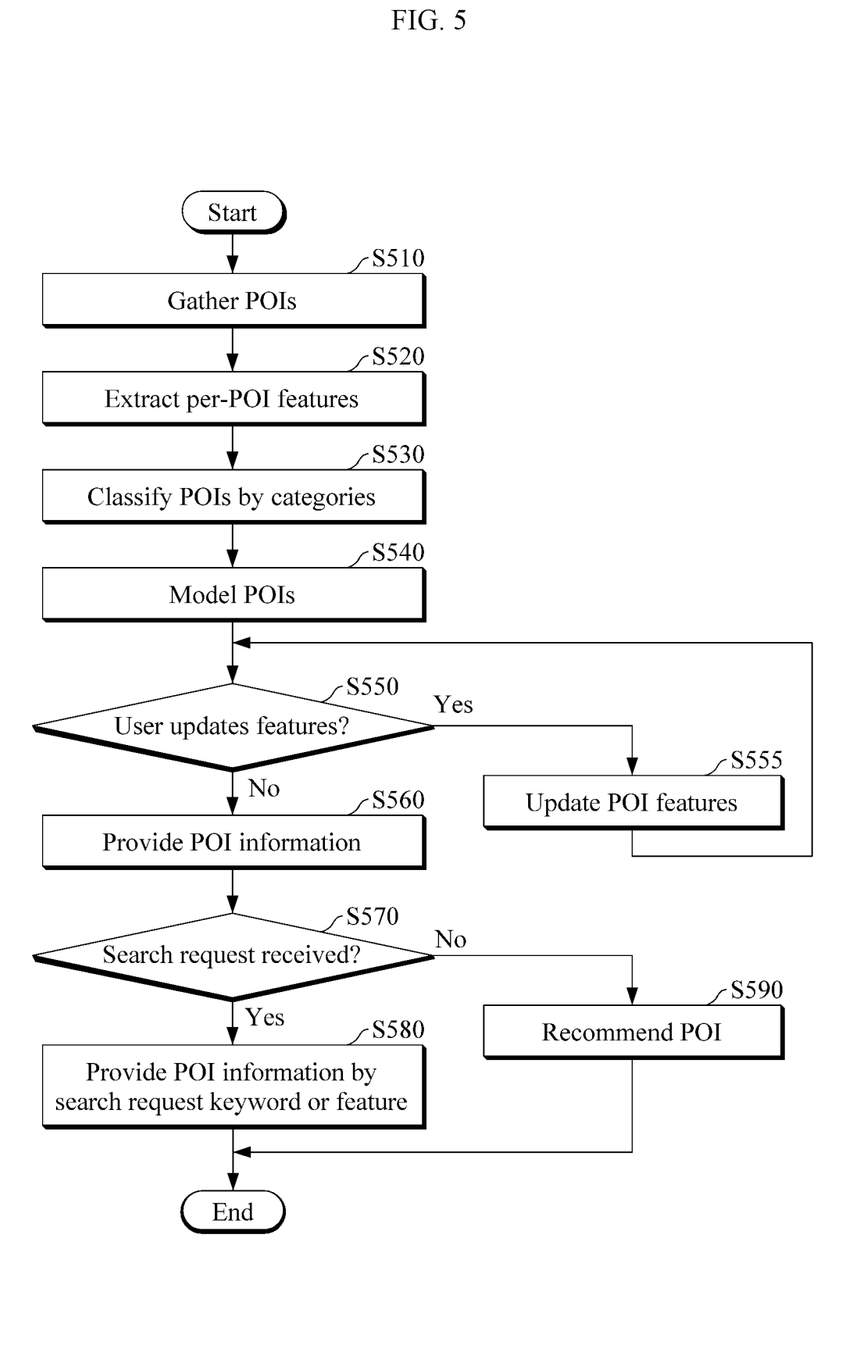
FIG. 5 is a flowchart illustrating a POI search and recommend process through POI modeling according to an embodiment.

FIG. 5 is a flowchart illustrating a POI search and recommend process through POI modeling according to an embodiment.

According to an embodiment, the POI search and recommend process through POI modeling gathers target POIs to be modeled, extracts per-POI features by the service provider, classifies the POIs by category according to the extracted POI features, and models the POIs.

According to an embodiment, the POI modeling designing or the POI search and recommend process includes a POI gathering step S510 that gathers target POIs to be modeled in various manners.

According to an embodiment, the POI gathering step is implemented by various manners, such as crawling, document/data lookup, or on-site inspection. The POI gathering step filters, extracts, and gathers web data corresponding to, e.g., POI name and location, from the gathered data.

The POI search and recommend process includes a feature extracting step S520 that extracts features for each of the POIs gathered in the POI gathering step.

According to an embodiment, the POI feature may be formed of a combination of default feature values defined as a finite set. According to an embodiment, the feature extraction may be extraction based on the feature defined by the user.

According to an embodiment, the POI feature may be formed of a combination of default feature values defined as a finite set by the service provider. However, without limited thereto, the POI feature may further include features defined by the user. POI feature update information may be inputted by the user through the POI feature updating unit 220 of the user terminal 20 and may be added by the POI modeling management unit 160 of the POI search and recommend server 100.

In other words, the feature for each user-defined POI received from the user terminal may be constituted of a combination of at least two default feature values defined as a definite set.

The POI search and recommend process includes a classifying step S530 that classifies the POI by category, according to the feature of each POI received by the service provider, based on the per-POI features extracted in the feature extracting step.

According to an embodiment, the classifying step classifies the POIs by the per-POI features, extracted in the feature extracting step, and by POI category.

In this case, the classifying step may set categories based on per-POI features set by the user's definition and classify the POIs. For example, the user may directly set various features, such as places good to use a stroller, places available for scooters or bicycles, places available for moving in a wheelchair, places close to the parking lot, and cafes with access to the beach. As another example, the user may directly set various types of features, such as places where the discount rate of admission tickets or prices is a predetermined value or more or places rated high on a specific booking website.

Thereafter, the per-POI feature information extracted in the feature extracting step is modeled to be vectorized.

According to an embodiment, the POI search and recommend process further includes a POI modeling step (S540) in which the per-POI features extracted by the service provider and features newly updated by the user are constituted of a combination of default feature values and learning-purpose feature values for training artificial intelligence.

The POI modeling step S540 models the POIs gathered by the POI data pre-processing step and outputs the POI model including attribute information and features for learning.

According to an embodiment, the POI search and recommend process, e.g., the POI modeling step, performs POI modeling so that the POI feature information may be vectorized according to the setting feature classified by the classifying unit 126, thereby generating a POI model. The POI modeling step S540 models feature values, extracted for the list of the gathered POIs, classified values, and default information, constituting the POI model.

For example, the POI model includes attributes (general features) including category classified values, prices or costs, location, or other default information, and travel site feature values, and learning-purpose features used for artificial intelligence (AI) training, e.g., for route recommendation or travel site recommendation, among the travel site feature values.

The POI search and recommend process, e.g., the POI modeling step, may set per-POI features by the service provider. For example, the POI model may be formed so that the POIs are divided by various types of user-defined features, such as places good to use a stroller, places available for scooters or bicycles, places available for moving in a wheelchair, places close to the parking lot, and cafes with access to the beach, places where the discount rate of admission tickets or prices is a predetermined value or more or places rated high on a specific booking web site.

Thereafter, if the user updates the POI model with new feature information through the user terminal (S550), the POI search and recommend process updates the POI modeling data through the POI modeling management unit (S555).

According to an embodiment, the POI search and recommend process may further include a POI feature update step (S555) that, if new POI feature information is inputted from the user terminal, updates the POI features according to the inputted POI feature update information. The per-POI features extracted by the service provider and the POI features updated in the POI feature update step are constituted of a combination of default feature values and learning-purpose feature values for training artificial intelligence.

Thereafter, the POIs modeled by the POI modeling step, or the POI model created by the POI modeling step, is provided, per extracted feature or per POI category, to the user terminal (S560).

Providing the modeled POIs may include, e.g., providing images and brief dictionary definitions, map images or other users' reviews, related places or visitable places, or cafes or restaurants within a predetermined distance, and a list of similar travel destinations, for the POI requested to be searched or selected by the user. However, without limited thereto, other various pieces of information about the POI selected by the user may be provided.

Thereafter, if a search request including the per-POI features extracted by the service provider or the POI feature information updated by the user is received (S570), information matching the search keyword or the POI feature information inputted from the user terminal is provided to the user (S580).

If there is no separate search request, the user data is learned based on the learning-purpose features included in the POIs modeled in the POI modeling step and a user-customized POI list is recommended (S590).

The POI search and recommend process further includes a POI modeling management step S580 that adds, modifies, or deletes the modeling data modeled in the POI modeling step. Thus, the user may models various POI features at his convenience and may thus search for his desired information more quickly.

According to an embodiment, the POI recommendation step further recommends POIs based on the per-POI features extracted by the service provider, the features updated by the user, and the data modeled in the POI modeling step.

The feature classification areas for POI recommendation may be added, deleted, or modified by the user. According to an embodiment, the POI recommending step S590 may extract and recommend a POI object for each feature.

According to an embodiment, it is possible to grasp or obtain objective data, such as the same age or gender, or residence location as the user, based on the user data. The POI recommending step S590 may extract and recommend POI features or POI objects preferred by other users and having the same condition as the objective criterion.

Further, the POI recommending step S590 may extract and recommend the POI objects in which the user may be interested, by monitoring the user's social media or social network service (SNS) or applying the result of search for the existing POI preferred by the user.

The POI recommending step S590 may extract and recommend the POI object based on data inputted by the user to define the POI feature, from the user terminal. For example, when the user sets the POI feature as "cafe near beach,' the POI recommending step S590 may recommend accommodations or travel destinations near the beach.

In other words, the POI recommending unit 250 may monitor the history of POI features set by the user, predict that POIs with the same objective/subjective index have a high user preference, and recommend the POIs. In other words, the POIs may be categorized according to the feature information set directly by the user, the POI object corresponding to the user's desired feature may be provided as a result of search or recommended. Thus, it is possible to systematically and efficiently use massive data on web postings.

The above-described method may be implemented as an application or in the form of program instructions executable through various computer components, which may then be recorded in a computer-readable recording medium. The computer-readable medium may include programming commands, data files, or data structures, alone or in combinations thereof.

The programming commands recorded in the computer-readable medium may be specially designed and configured for the disclosure or may be known and available to one of ordinary skill in the computer software industry.

Examples of the computer readable recording medium may include, but is not limited to, magnetic media, such as hard disks, floppy disks or magnetic tapes, optical media, such as CD-ROMs or DVDs, magneto-optical media, such as floptical disks, memories, such as ROMs, RAMs, or flash memories, or other hardware devices specially configured to retain and execute programming commands.

Examples of the programming commands may include, but are not limited to, high-level language codes executable by a computer using, e.g., an interpreter, as well as machine language codes as created by a compiler. The above-described hardware devices may be configured to operate as one or more software modules to perform processing according to the disclosure and vice versa.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A system for driving a point-of-interest (POI) search and recommend process through POI modeling, the system comprising:
    a POI data pre-processing unit gathering POIs to be modeled, extracting POI features from the gathered POIs by a service provider, and classifying the POIs by POI categories;
    a POI modeling unit modeling the POIs and outputting the modeled POIs, the modeled POIs including attribute information and learning-purpose features;
    a POI information providing unit providing the modeled POIs, by the POI features or the POI categories, through a user terminal;
    a POI search unit receiving a search request including a keyword or a POI feature from the user terminal;
    a POI recommending unit learning user data based on the learning-purpose features included in the modeled POIs and recommending a user-customized POI list through the user terminal; and
    a POI feature updating unit updating the POI features with POI feature update information received from the user terminal, wherein the POI data pre-processing unit includes:
    a POI gathering unit gathering the POIs to be modeled;
    a feature extracting unit extracting the POI features from the gathered POIs by the service provider; and
    a classifying unit classifying the POIs by the extracted POI features per POI category, wherein the POI modeling unit defines the POI features by a combination of features defined as a definite set by the service provider and outputs the POI model according to the POI feature information, wherein the POI feature information includes information including objective indexes including location information about the POI object or price attribute and subjective indexes including keywords or preferences included in reviews or introductions on web postings, and wherein the attributes of the POI model include category classified values, prices or costs, and location information, and the learning-purpose features include information used for artificial intelligence (AI) training including route recommendation or travel site recommendation.

2. The system of claim 1, further comprising a POI modeling management unit adding, modifying, or deleting the modeled POIs or the updated POI features.

3. The system of claim 1, wherein the POI recommending unit recommends a POI based on the POI features extracted by the service provider, POI features received from the user terminal, or the modeled POIs.

4. A POI search and recommend process through POI modeling, comprising:
    a POI data pre-processing step gathering POIs to be modeled, extracting POI features from the gathered POIs by a service provider, and classifying the POIs by POI categories;
    a POI modeling step modeling the POIs and outputting the modeled POIs, the modeled POIs including attribute information and learning-purpose features;
    a POI information providing step providing the modeled POIs, by the POI features or the POI categories, through a user terminal;
    a POI search step receiving a search request including a keyword or a POI feature from the user terminal;
    a POI recommending step learning user data based on the learning-purpose features included in the modeled POIs and recommending a user-customized POI list through the user terminal; and
    a POI feature updating step updating the POI features with POI feature update information received from the user terminal, wherein the POI data pre-processing step includes:
    a POI gathering step gathering the POIs to be modeled;
    a feature extracting step extracting the POI features from the gathered POIs by the service provider; and
    a classifying step classifying the POIs by the extracted POI features or POI categories, wherein the POI modeling step defines the POI features by a combination of features defined as a definite set by the service provider and outputs the POI model according to the POI feature information, wherein the POI feature information includes information including objective indexes including location information about the POI object or price attribute and subjective indexes including keywords or preferences included in reviews or introductions on web postings, and wherein the attributes of the POI model include category classified values, prices or costs, and location information, and the learning-purpose features include information used for artificial intelligence (AI) training including route recommendation or travel site recommendation.

5. The POI search and recommend process of claim 4, further comprising a POI modeling management step adding, modifying, or deleting the modeled POIs or the updated POI features.

6. The POI search and recommend process of claim 4, wherein the POI recommending step recommends a POI based on the POI features extracted by the service provider, POI features received from the user terminal, or the modeled POIs.

\* \* \* \* \*